United States Patent Office 3,328,482
Patented June 27, 1967

3,328,482
SILICONE CONTROLLED RELEASE AGENTS
Hal J. Northrup, Alma, and Murrel A. Brown, Midland, Mich., assignors to Dow Corning Corporation, Midland, Mich., a corporation of Michigan
No Drawing. Filed Jan. 8, 1965, Ser. No. 424,174
8 Claims. (Cl. 260—825)

This application relates to new antistick agents that have a controllable release capability.

Cured dimethylpolysiloxane gums are effective and well-known release agents for such uses as preventing asphalt from adhering to the paper container in which it is packed.

In many uses, however, it is possible for the release capability of a substrate to be too great. For example, pull-away backings for adhesive tapes must separate without difficulty from the adhesive that they protect, but they must not contain such effective release agents that they accidentally fall off or slide away. Such occurrences are possible with the presently-known silicone release agents.

An object of this invention is to provide silicone release agents with release capabilities that are less effective than the presently-known silicone release agents, and to provide a sequence of release agents that have varying release capabilities, so that a release agent having precisely the desired release capability for most situations can be obtained. Another object is to provide release films in which the release value is essentially constant with time.

This application relates to a composition consisting essentially of (a) 100 parts by weight of a polyorganosiloxane which is curable to an elastomer, consisting essentially of 0 to 15 mol percent of units selected from the group consisting of

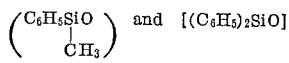  and  [(C₆H₅)₂SiO]

and essentially all of the remaining units being of the formula

where R is selected from the group consisting of methyl and ethyl radicals; and (b) from 0.5 to 100 parts by weight of a polymeric material consisting essentially of units selected from the group consisting of butylene and propylene, and having a molecular weight of over 400.

Any curable organopolysiloxane that falls within the description of (a) above is operable in this invention. Any one of the known curing methods for silicone elastomers can be used in this invention.

For example, the following organosiloxane polymers and curing agents are suitable for this invention:

(1)
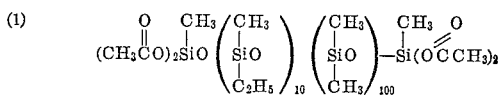

which cures on exposure to moisture in the air.

(2)
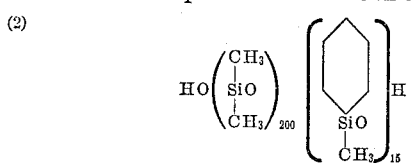

plus ethylpolysilicate as a crosslinking agent. Cures on heating.

(3)
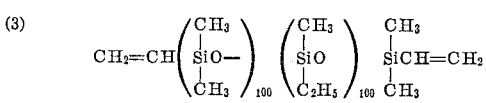

plus

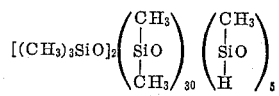

plus chloroplatinic acid as a curing catalyst. Cures on heating.

A preferred ingredient (a) consists essentially of 95 to 98 weight percent of a silanol-endblocked dimethylpolysiloxane gum and from 2 to 5 weight percent of a fluid methylhydrogenpolysiloxane having trimethylsiloxy-endblocks, which acts as a crosslinking and curing agent through the reaction of SiH and silanol groups on heating to form the siloxane linkage and hydrogen.

Alternatively, the preferred ingredient (a) can contain a dimethylpolysiloxane that is copolymerized so as to contain up to 10 mol percent of phenylmethylsiloxane or diphenylsiloxane units.

As is seen above, the organopolysiloxane (a) can contain more than one type of molecule.

The term "consisting essentially of" is meant to imply that minor amounts of other siloxane units than those specifically defined in the claims below can be included in the siloxanes without departing from this invention. Examples of such units can be seen in the formulae above, where crosslinking and curing is implemented by siloxane units that are not mentioned in the claims. Examples of other such units are

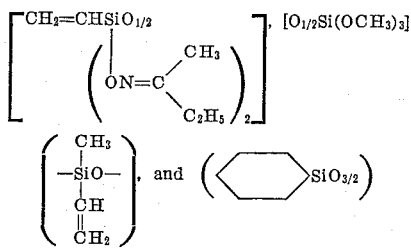

Ingredient (b) can be any polymer having a molecular weight of over 400 that consists essentially of butylene and/or propylene units.

It is preferred for the polymer to consist of more than 60 mol percent of isobutylene units

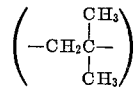

Other desirable units are

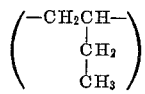

and

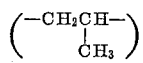

The preferred polymers have a molecular weight of over 800. It is also generally desirable for their molecular weight not to exceed 2000, though higher polymers are operative.

It has been found that ingredient (b) reduces the release capability of ingredient (a) to a degree that is dependent on the amount of ingredient (b) present, i.e. increased amounts of ingredient (b) reduce the release capability of the composition.

It is therefore an easy matter to tailor-make a release agent of this invention that has exactly the desired release capability for a given use.

The presence of ethyl and/or phenyl radicals in ingredient (a) serves to further reduce the release capability of the compositions of this invention, which broadens the spectrum of release values that can be obtained.

It has also been found that when ingredient (a) is virtually all methylsiloxane and ingredient (b) is primarily polyisobutylene, the cured coating of release agent on a substrate is especially slow to change its release value through the passage of time, which change is known as "drift." Drift is a common problem among release agents.

When only about one percent of ingredient (b) is used in the compositions of this invention, the change in the initial release value, as compared with the pure silicone, is small, but that small amount of ingredient (b) inhibits the tendency of silicone release agents to gain more release capability with time (i.e. to drift) after they have been cured as films.

The silicone release agents of this invention must be cured to prevent them from migrating into areas where they are not desired. This is also the case for known silicone release agents.

Ingredients (a) and (b) are best mixed by dissolving or dispersing them together in a mutual solvent. This solution can then conveniently be used to apply the release agent to the substrate on which it is to be cured. It is preferred, therefore, to use a volatile solvent such as xylene, ethanol, beta-methoxyethanol, benzene, hexane, heptane, diethylether, methylethyl ketone, tetrahydrofuran, cyclopentane, cycloheptene, or isopropanol as the carrier for ingredients (a) and (b). Any solvent or compatible liquid that does not react with the two ingredients is, however, operative if the liquid can be thereafter removed.

It is preferred to use a dispersion of from 1 to 40 weight percent of the composition of this invention in 60 to 99 weight percent of volatile solvent as the means for applying the composition to the substrate on which it is to be cured. It is further preferred to use a solution of 5 to 20 weight percent of the release agent in 80 to 95 weight percent of volatile solvent.

Ingredients (a) and (b) can also be mixed by melting the ingredients, if they are not already fluid, or by any other known method. The method of application of these compositions to substrates is not critical.

The release agents of this invention can be used on any substrate, e.g., glass, stone, plastic, rubber, metal, wood, and paper. They will give release against virtually all adhesives and sticky materials such as tar, pitch, raw rubber, and synthetic pressure sensitive adhesives.

It is preferred to use the compositions of this invention on substrates which are cellulosic sheets, e.g. cellophane, corrugated paper, kraft paper, cardboard, cellulose acetate sheets, wrapping paper, and cotton fabric.

The following examples are illustrative only and should not be construed as limiting the invention, which is properly delineated in the appended claims.

*Example 1*

A silicone composition consisting essentially of 96 weight percent of a hydroxyl-endblocked dimethylpolysiloxane gum, 3 weight percent of

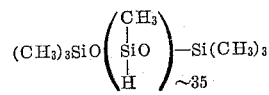

one weight percent of silica as a stabilizer, and a trace of dibutyltin dioctoate curing catalyst was mixed in varying proportions with a polyisobutene polymer having a molecular weight of 1500 (Oronite No. 128). This was diluted to 10 weight percent solids in xylene.

A sample of the above silicone composition alone was diluted to 10 weight percent solids in xylene.

These compositions were used to coat stiff paper by drawdown with a No. 14 Mayer rod, and were cured at 250° F. for two minutes.

The release capabilities of the coated papers were tested by measuring the force needed to remove one-inch width Johnson and Johnson adhesive tape from the coated paper by a pull normal to the plane of the paper. This is called the Release Test, and is used throughout the examples.

The test was performed immediately after preparation and after aging the coated papers for the times listed below. The results were as follows:

(a) Pure silicone release agent:

Time paper aged:                          Release (gm.)
   Initial _____ 25
   Average of 30 and 60 day readings _____ 10

(b) 86.9 weight percent silicone; 13.1 weight percent polyisobutylene:

Time paper aged:                          Release (gm.)
   Initial _____ 42
   Average of 30 and 60 day readings _____ 54

(c) 80.4 weight percent silicone; 19.6 weight percent polyisobutylene:

Time paper aged:                          Release (gm.)
   Initial _____ 86
   Average of 30 and 60 day readings _____ 75

(d) 73.8 weight percent silicone; 26.2 weight percent polyisobutylene:

Time papers aged:                         Release (gm.)
   Initial _____ 98
   Average of 30 and 60 day readings _____ 83

*Example 2*

Samples containing 90 weight percent of the silicone composition of Example 1 were mixed with 10 weight percent of the following polyisobutylene polymers, and diluted to 10 percent solids in xylene.

These solutions were applied to stiff paper and cured at 250° F. for two minutes. The release test results were as follows:

(a) Using a polyisobutylene with an approximate molecular weight of 840:

Time paper aged:                          Release (gm.)
   Initial _____ 35
   30 days _____ 36

(b) Using a polyisobutylene with an approximate molecular weight of 1200:

Time paper aged:                          Release (gm.)
   Initial _____ 32
   30 days _____ 47

*Example 3*

A mixture of 80 weight percent of the silicone composition of Example 1 and 20 weight percent of polypropylene having an approximate molecular weight of 30,000 was diluted to a 10 percent solids solution with xylene.

This solution was applied to stiff paper and cured at 250° F. for two minutes.

Application of the release test gave an initial release of 33 g., and a release after aging the paper for 24 hours of 31 g.

*Example 4*

A composition consisting essentially of (a) 97 weight percent of a hydroxyl-endblocked, gummy copolymer of 92.5 mol percent of dimethylsiloxane units and 7.5 mol percent of phenylmethylsiloxane units, (b) 3 weight percent of a siloxane of the formula

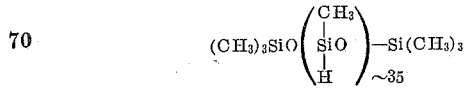

and (c) a trace of dibutyltin dioctoate curing catalyst was diluted to 10 percent solids in xylene. This solution was applied to stiff paper, and cured at 250° F. for 2 minutes.

The paper was tested by the release test to yield an initial release of 33 gm. and a release after 30 days of aging of 35 g.

Compositions within the scope of this invention were prepared by mixing the above silicone composition with varying amounts of polyisobutylene which had an average molecular weight of about 1500, and diluting to 10 percent solids with xylene.

The solutions of these compositions were placed on stiff paper and cured at 250° F. for 2 minutes. The papers were then subjected to the release test. The results are shown below:

Using 99.3 weight percent silicone plus 0.7 weight percent polyisobutylene:

| Time paper aged: | Release (gm.) |
|---|---|
| Initial | 57 |
| 30 days | 81 |

Using 98.7 weight percent silicone and 1.3 weight percent polyisobutylene:

| Time paper aged: | Release (gm.) |
|---|---|
| Initial | 62 |
| 30 days | 87 |

Using 70 weight percent silicone and 30 weight percent polyisobutylene:

| Time paper aged: | Release (gm.) |
|---|---|
| Initial | 166 |
| 1 day | 209 |
| Average of 30 and 90 day readings | 223 |

*Example 5*

When 40 g. of a polymer having a molecular weight of approximately 410 and consisting of equal molar proportions of propylene and isobutylene units is dispersed in 60 g. of

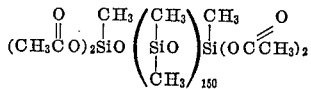

a composition is formed that cures to a rubbery film on heating in humid air at 70° C., and which has release properties against tar that are poorer than dimethylpolysiloxane rubbers, but are better than cellulosic materials.

That which is claimed is:

1. A composition consisting essentially of an intimate physical mixture of
  (a) 100 parts by weight of polyorganosiloxane which is curable by a technique which does not utilize free radicals to an elastomer, consisting essentially of 0 to 15 mol percent of units selected from the group consisting of

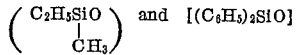

and essentially all of the remaining units being of the formula

where R is selected from the group consisting of methyl and ethyl radicals; and
  (b) from 0.5 to 100 parts by weight of a polymeric material consisting essentially of units of isobutylene having a molecular weight of over 400.

2. A composition consisting essentially of a dispersion of 1 to 40 weight percent of the composition of claim 1, and from 60 to 99 weight percent of a volatile solvent for both (a) and (b) of claim 1.

3. A composition consisting essentially of an intimate physical mixture of
  (a) 100 parts by weight of polyorganosiloxane which is curable to an elastomer, consisting essentially of 95 to 98 weight percent of a silanol-endblocked dimethylpolysiloxane and from 2 to 5 weight percent of a fluid methylhydrogenpolysiloxane, and
  (b) from 5 to 50 parts by weight of a polymeric fluid consisting essentially of isobutylene units, and having a molecular weight of at least 800.

4. A composition consisting essentially of a solution of 5 to 20 weight percent of the composition of claim 3 and from 80 to 95 weight percent of a volatile solvent for both (a) and (b) of claim 3.

5. A substrate having coated thereon a cured film consisting essentially of an intimate physical mixture of
  (a) 100 parts by weight of an elastomeric polyorganosiloxane consisting essentially of 0 to 15 mol percent of units selected from the group consisting of

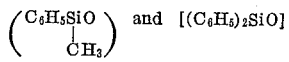

and essentially all of the remaining units being of the formula

where R is selected from the group consisting of methyl and ethyl radicals; and
  (b) from 0.5 to 100 parts by weight of a polymeric material consisting essentially of units of isobutylene having a molecular weight of over 400.

6. The article of claim 5 where the substrate is a cellulosic sheet.

7. The article of claim 5 where R is methyl.

8. A cellulosic sheet having coated thereon a cured film consisting essentially of an intimate physical mixture of
  (a) 100 parts by weight of an elastomeric polyorganosiloxane consisting essentially of methylsiloxane units, and
  (b) from 5 to 50 parts by weight of a polymeric fluid consisting essentially of isobutylene units, and having a molecular weight of at least 800.

References Cited

UNITED STATES PATENTS

| 2,588,393 | 3/1952 | Kauppi | 260—825 |
| 2,716,128 | 8/1955 | West | 260—827 |
| 2,869,722 | 1/1959 | Marander et al. | 206—84 |
| 2,985,545 | 5/1961 | Leavitt | 260—825 |
| 3,159,662 | 12/1964 | Ashby | 260—46.5 |
| 3,227,777 | 1/1966 | Safford | 260—827 |

FOREIGN PATENTS

| 876,762 | 9/1961 | Great Britain. |
| 1,207,260 | 8/1959 | France. |
| 1,334,560 | 7/1963 | France. |

SAMUEL H. BLECH, *Primary Examiner.*

DONALD E. CZAJA, *Examiner.*

M. I. MARQUIS, *Assistant Examiner.*